(12) United States Patent
Kurian et al.

(10) Patent No.: US 10,320,902 B2
(45) Date of Patent: Jun. 11, 2019

(54) DETECTING ASYMMETRIC AWARENESS IN PEER-TO-PEER PROTOCOL

(71) Applicant: Apple Inc., Cupertino, CA (US)

(72) Inventors: Lawrie Kurian, San Jose, CA (US); Anand Rajagopalan, Saratoga, CA (US); Saravanan Balasubramaniyan, Los Gatos, CA (US); Tashbeeb Haque, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 15/661,785

(22) Filed: Jul. 27, 2017

(65) Prior Publication Data

US 2018/0063240 A1    Mar. 1, 2018

Related U.S. Application Data

(60) Provisional application No. 62/381,788, filed on Aug. 31, 2016.

(51) Int. Cl.
| | | |
|---|---|---|
| H04L 29/08 | (2006.01) | |
| H04W 4/06 | (2009.01) | |
| H04W 84/12 | (2009.01) | |
| H04W 76/14 | (2018.01) | |
| H04W 40/24 | (2009.01) | |

(52) U.S. Cl.
CPC ........... *H04L 67/1068* (2013.01); *H04W 4/06* (2013.01); *H04L 29/08423* (2013.01); *H04W 40/244* (2013.01); *H04W 76/14* (2018.02); *H04W 84/12* (2013.01)

(58) Field of Classification Search
CPC combination set(s) only.
See application file for complete search history.

(56) References Cited

U.S. PATENT DOCUMENTS

| | | | |
|---|---|---|---|
| 6,456,599 B1 | 9/2002 | Elliott | |
| 7,613,156 B2 * | 11/2009 | Rittle | H04W 8/005 370/338 |
| 7,706,340 B2 | 4/2010 | Bronez | |
| 7,715,354 B2 | 5/2010 | Arunan et al. | |
| 8,428,079 B1 * | 4/2013 | Lambert | H04W 8/005 370/461 |
| 8,942,130 B2 | 1/2015 | Kumar et al. | |
| 9,647,875 B1 * | 5/2017 | Lambert | H04L 41/00 |
| 2012/0163265 A1 * | 6/2012 | Kotecha | H04W 74/006 370/312 |
| 2012/0315853 A1 * | 12/2012 | Lambert | H04W 8/005 455/41.2 |
| 2013/0148545 A1 * | 6/2013 | Jung | H04W 48/16 370/255 |
| 2014/0254513 A1 * | 9/2014 | Abraham | H04W 4/70 370/329 |
| 2014/0258395 A1 * | 9/2014 | Tng | H04L 67/16 709/204 |

(Continued)

*Primary Examiner* — Warner Wong
(74) *Attorney, Agent, or Firm* — Meyertons Hood Kivlan Kowert and Goetzel PC; Jeffrey C. Hood; Brian E. Moore

(57) ABSTRACT

In some embodiments, one or more wireless stations operate to configure direct communication with neighboring mobile stations, e.g., direct communication between the wireless stations without utilizing an intermediate access point. Embodiments of the disclosure relate to techniques for devices (e.g., NAN devices and/or AWDL devices) to detect asymmetric awareness amongst peers.

20 Claims, 9 Drawing Sheets

(56) References Cited

U.S. PATENT DOCUMENTS

2014/0370863 A1* 12/2014 Proctor, Jr. ........... H04W 4/029
  455/414.3
2016/0112860 A1* 4/2016 Sorrentino ............ H04W 8/005
  370/329
2016/0135201 A1* 5/2016 Brahmi ................... H04L 5/006
  370/329

* cited by examiner

DETECTING ASYMMETRIC AWARENESS IN PEER-TO-PEER PROTOCOL

PRIORITY DATA

This application claims benefit of priority to U.S. Provisional Application Ser. No. 62/381,788, titled "Detecting Asymmetric Awareness in Peer-to-Peer Protocol," filed Aug. 31, 2016, by Lawrie Kurian, Anand Rajagopalan, Saravanan Balasubramaniyan, and Tashbeeb Haque, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and/or multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, a device that wirelessly connects to other devices is referred to as a "station" or STA, "mobile station", "user device" or "user equipment" or UE for short. Wireless stations can be either wireless Access Points (APs) or wireless clients (or mobile stations). APs, which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices, such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

SUMMARY

Some embodiments described herein relate to systems and methods for peer wireless stations (e.g., wireless stations configured to communicate with neighboring wireless stations without utilizing an intermediate access point) to detect asymmetric awareness amongst peers. For example, a first wireless station may be aware of a second wireless station, e.g., through receipt of one or more beacons, but the second wireless station may not be aware of the first wireless station, resulting in asymmetric awareness between the first and second wireless stations.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to detecting asymmetric awareness amongst peer wireless stations.

In some embodiments, a wireless station (or a processor, processing element, and/or baseband processor wireless station) may be configured to transmit a first beacon that includes first information identifying the wireless station to neighboring wireless stations and receive a second beacon from a first neighboring wireless station. The wireless station may be configured to determine that the second beacon includes the first information and initiate, based (at least in part) on the second beacon including the first information, a data communication session with the first neighboring wireless station. In some embodiments, to determine that the second beacon includes the first information, the wireless station may be further configured to search an attribute of the second beacon for the first information. In some embodiments, the wireless station may be further configured to receive a third beacon from a second neighboring wireless station, determine that the third beacon does not include the first information, and based (at least in part) on the third beacon not including the first information, determine to not initiate a data communication session with the second neighboring wireless station.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

For example.

Figure 1:
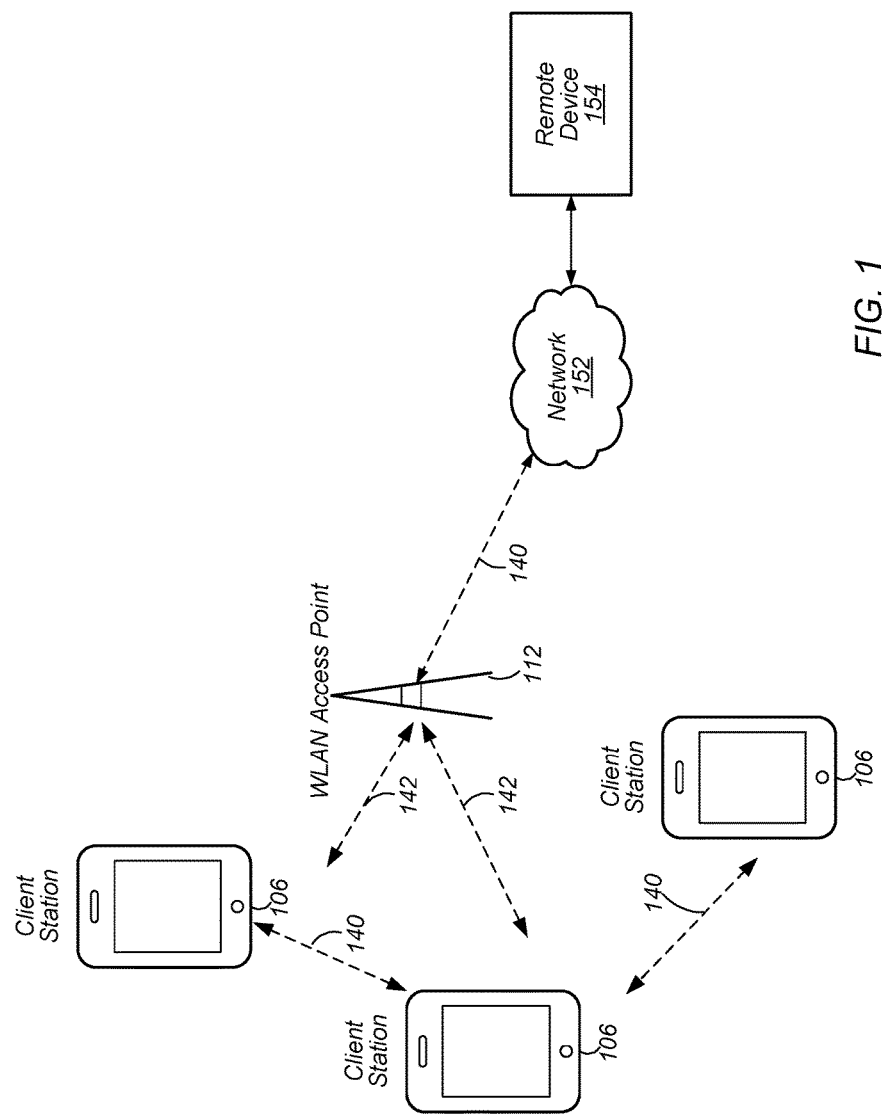
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods for detecting asymmetric awareness amongst peers. In some embodiments, the wireless device 106 may be configured to transmit a first beacon that includes first information identifying the wireless device 106 to neighboring wireless devices (e.g., other wireless devices 106 and/or access point 112) and receive a second beacon from a first neighboring wireless device. The wireless device 106 may be configured to determine that the second beacon includes the first information and initiate, based (at least in part) on the second beacon including the first information, a data communication session with the first neighboring wireless device. In some embodiments, to determine that the second beacon includes the first information, the wireless device may be further configured to search an attribute of the second beacon for the first information. In some embodiments, the wireless device may be further configured to receive a third beacon from a second neighboring wireless device, determine that the third beacon does not include the first information, and based (at least in part) on the third beacon not including the first information, determine to not initiate a data communication session with the second neighboring wireless device.

Figure 2:
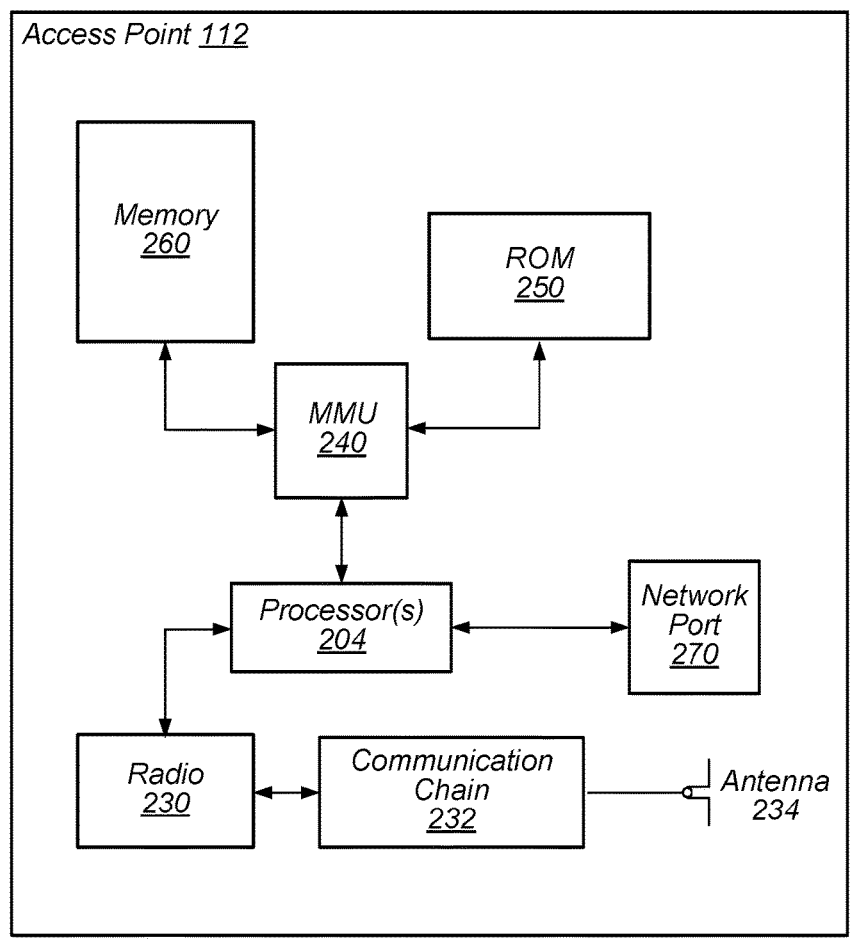
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for detecting asymmetric awareness amongst peers. In some embodiments, the AP 112 may be configured to transmit a first beacon that includes first information identifying the AP 112 to neighboring wireless stations (e.g., wireless stations 106) and receive a second beacon from a first neighboring wireless station. The AP 112 may be configured to determine that the second beacon includes the first information and initiate, based (at least in part) on the second beacon including the first information, a data communication session with the first neighboring wireless station. In some embodiments, to determine that the second beacon includes the first information, the AP 112 may be further configured to search an attribute of the second beacon for the first information. In some embodiments, the AP 112 may be further configured to receive a third beacon from a second neighboring wireless station, determine that the third beacon does not include the first information, and based (at least in part) on the third beacon not including the first information, determine to not initiate a data communication session with the second neighboring wireless station.

Figure 3:
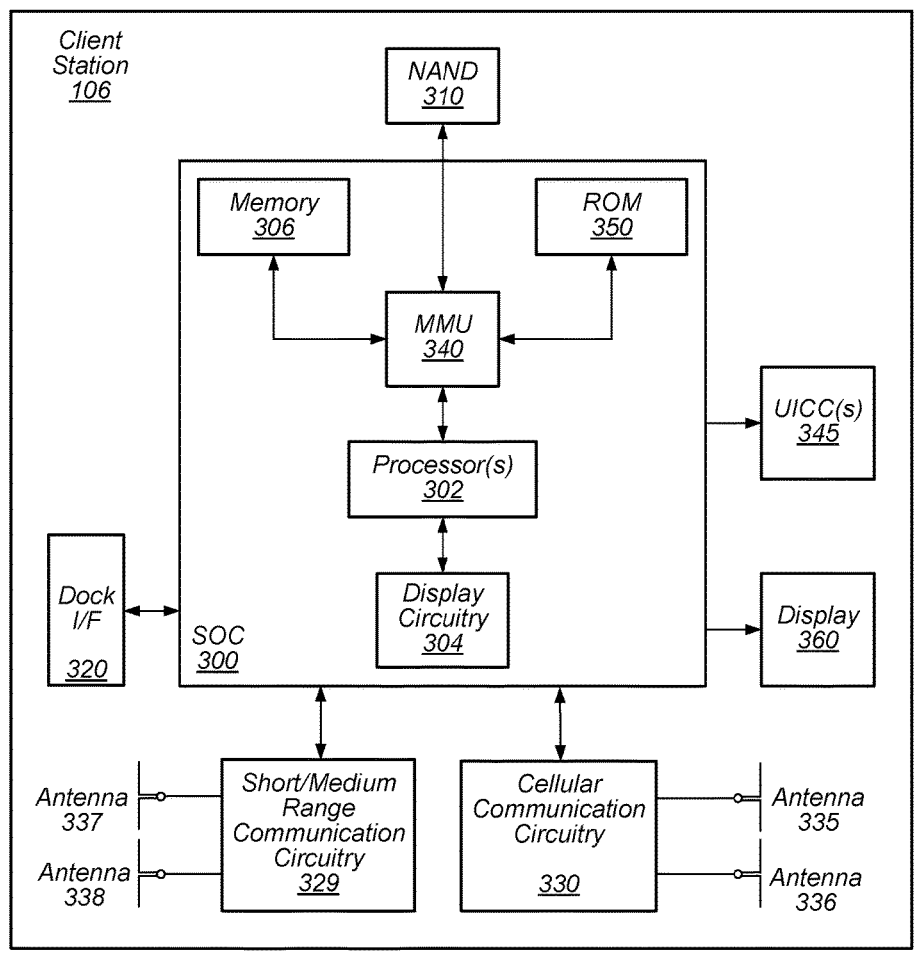
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for detecting asymmetric awareness amongst peers. In some embodiments, the client station 106 may be configured to transmit a first beacon that includes first information identifying the client station 106 to neighboring client stations (e.g., other client stations 106 and/or AP 112) and receive a second beacon from a first neighboring client station. The client station may be configured to determine that the second beacon includes the first information and initiate, based (at least in part) on the second beacon including the first information, a data communication session with the first neighboring client station. In some embodiments, to determine that the second beacon includes the first information, the client station may be further configured to search an attribute of the second beacon for the first information. In some embodiments, the client station may be further configured to receive a third beacon from a second neighboring client station, determine that the third beacon does not include the first information, and based (at least in part) on the third beacon not including the first information, determine to not initiate a data communication session with the second neighboring client station.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein define methods for detecting asymmetric awareness amongst peers. For example, a first wireless station may be aware of a second wireless station, e.g., through receipt of one or more beacons, but the second wireless station may not be aware of the first wireless station, resulting in asymmetric awareness between the first and second wireless stations.

Detecting Asymmetric Discovery for Peer-to-Peer Communications

In some implementations of peer-to-peer communication (e.g., Apple Wireless Direct Link (AWDL) and NAN), peers may periodically transmit synchronization and/or discovery beacons on social channels in order to synchronize communications and/or discover new peer devices. In addition, information carried in these beacons (e.g., synchronization and/or discovery beacons) may be used for master election, to form a synchronization tree, and/or for service discovery.

Figure 4:
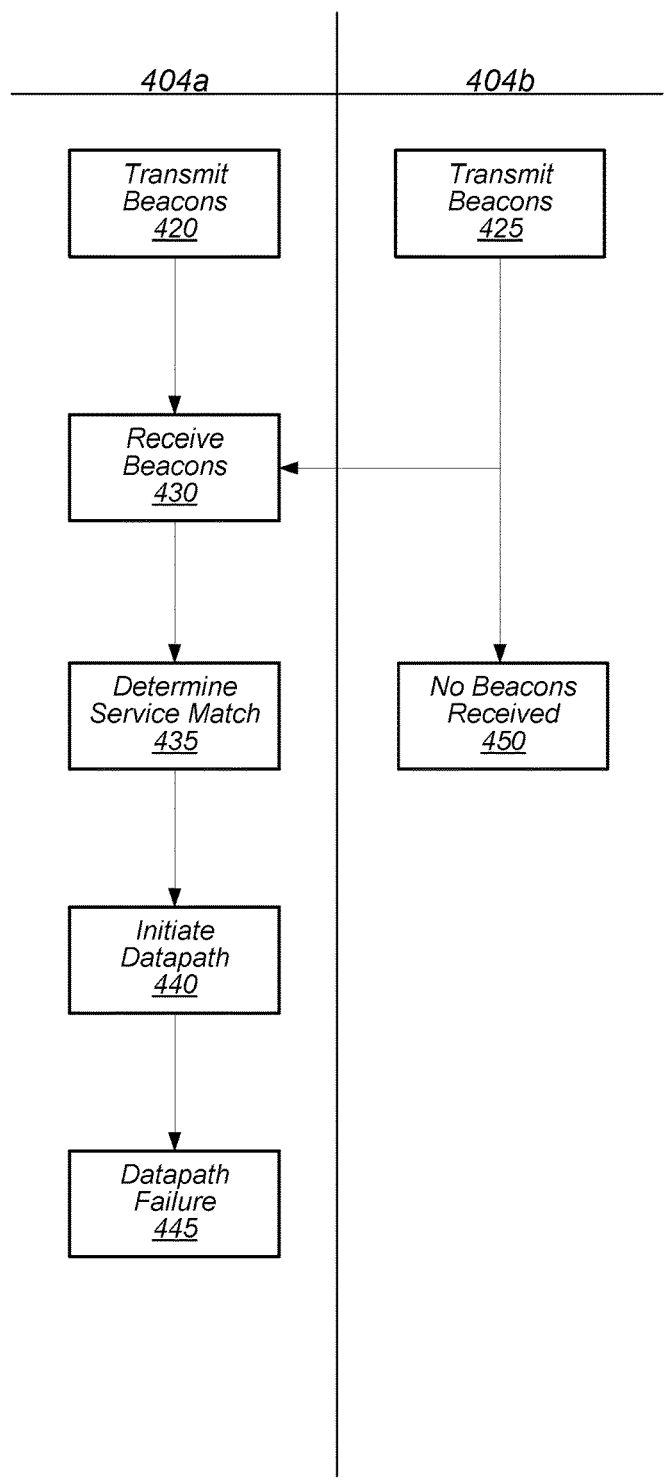
FIG. 4 illustrates an example scenario of asymmetric discovery.

For example, FIG. 4 illustrates an example scenario of asymmetric discovery, according to some implementations. As shown, at 420, device 404a may transmit (or broadcast) discovery beacons. Similarly, at 425, device 404b may also transmit (or broadcast) discovery beacons. At 430, device 404a may receive a discovery beacon transmitted by device 404b. In addition, upon discovering a service of interest from device 404b (e.g., as advertised in the discovery beacon transmitted at 425) at 435, device 404a may attempt to initiate a datapath negotiation with device 404b at 440. Thus, at 440, device 404a may transmit a unicast management frame to device 404b to initiate the datapath negotiation. Device 404a may assume that since it has discovered and received a beacon from device 404b, device 404b should have also discovered and received one or more beacons from device 404a. However, at 445, the datapath initiation may fail since device 404b failed to discover device 404a (e.g., as illustrated at 450).

However, the assumption of devices symmetrically discovering each other is not always valid. The discovery of peer devices (and thereby services offered by the peer devices) is dependent on the successful reception of broadcast beacons from the peer devices. However, absence of acknowledgements (ACKs) for broadcast frames makes it uncertain if peer devices received the broadcast frames successfully. Note that broadcast beacons are filtered out based on a fixed received signal strength indicator (RSSI) (a measurement of the power present in a received radio signal) value, which itself could vary on different peer devices based on the proximity and receiver sensitivity of the receiving peer device. Note further that in some implementations of peer-to-peer communications (e.g., AWDL and NAN) a fixed RSSI threshold is implemented for all peer devices. Thus, a first peer device may be able to discover and/or synchronize to a second peer device, however, the second peer device may not be able to discover and/or synchronize to the first peer device due to differing RSSIs, or other applied parameters such as signal to noise ratio (SNR), or packet error rate (PER) at the first and second peer device. For example, devices may have different transmission capabilities and/or experience different receive conditions.

In some implementations, asymmetric discovery may cause failure in the datapath initiation since a first device may detect a second device, but the second device may not detect the first device. For example, as illustrated in FIG. 4, device 404a discovered device 404b, however device 404b has not discovered device 404a (e.g., due to differences in RSSI at device 404a and device 404b). Further, in some scenarios, device 404a could have a higher master rank than device 404b and thus would not synchronize to device 404b. However, since device 404b did not receive beacons from device 404a, device 404b would not synchronize to device 404a. Additionally, datapath initiation frames transmitted by device 404a to device 404b would not be successful (since device 404b cannot receive transmissions from device 404a).

In such a scenario, device 404a may waste system resources attempting to initiate a datapath with device 404b. Further, unnecessary retransmissions and failure to establish a datapath introduces delays for device 404a.

Figure 5A:
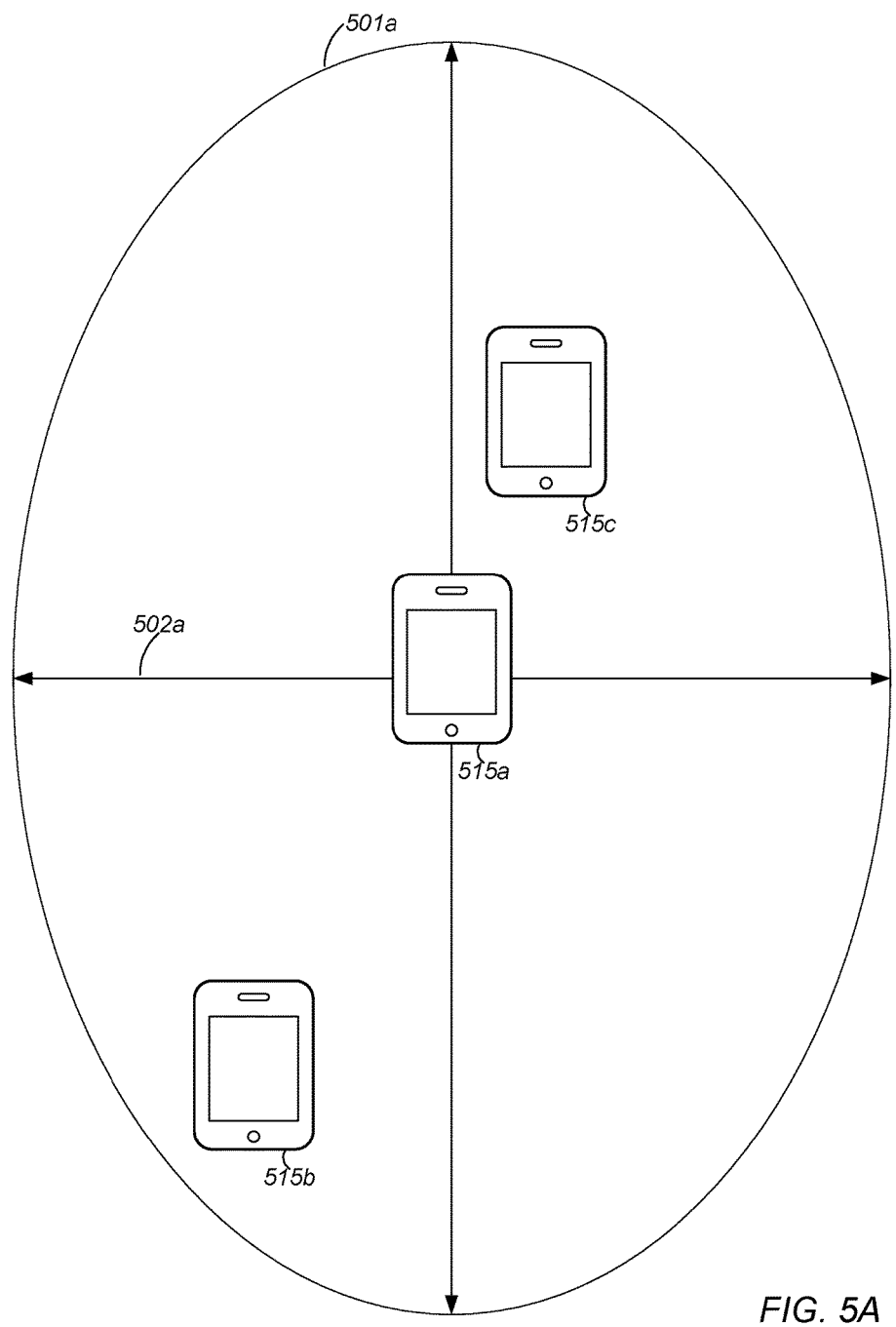
FIGS. 5A-C illustrate example scenarios of asymmetric behavior based on RSSI threshold.
Figure 5B:
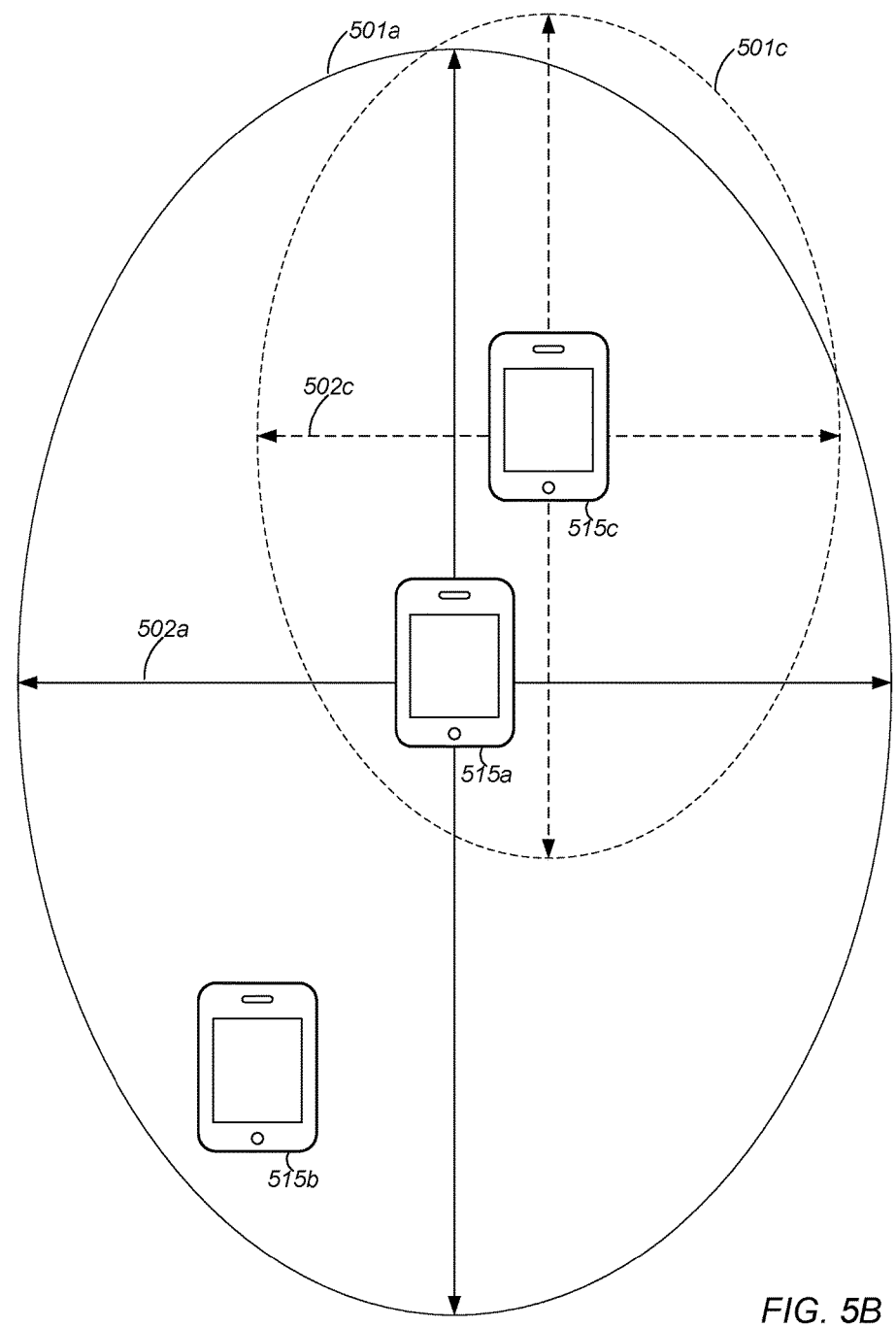
Figure 5C:
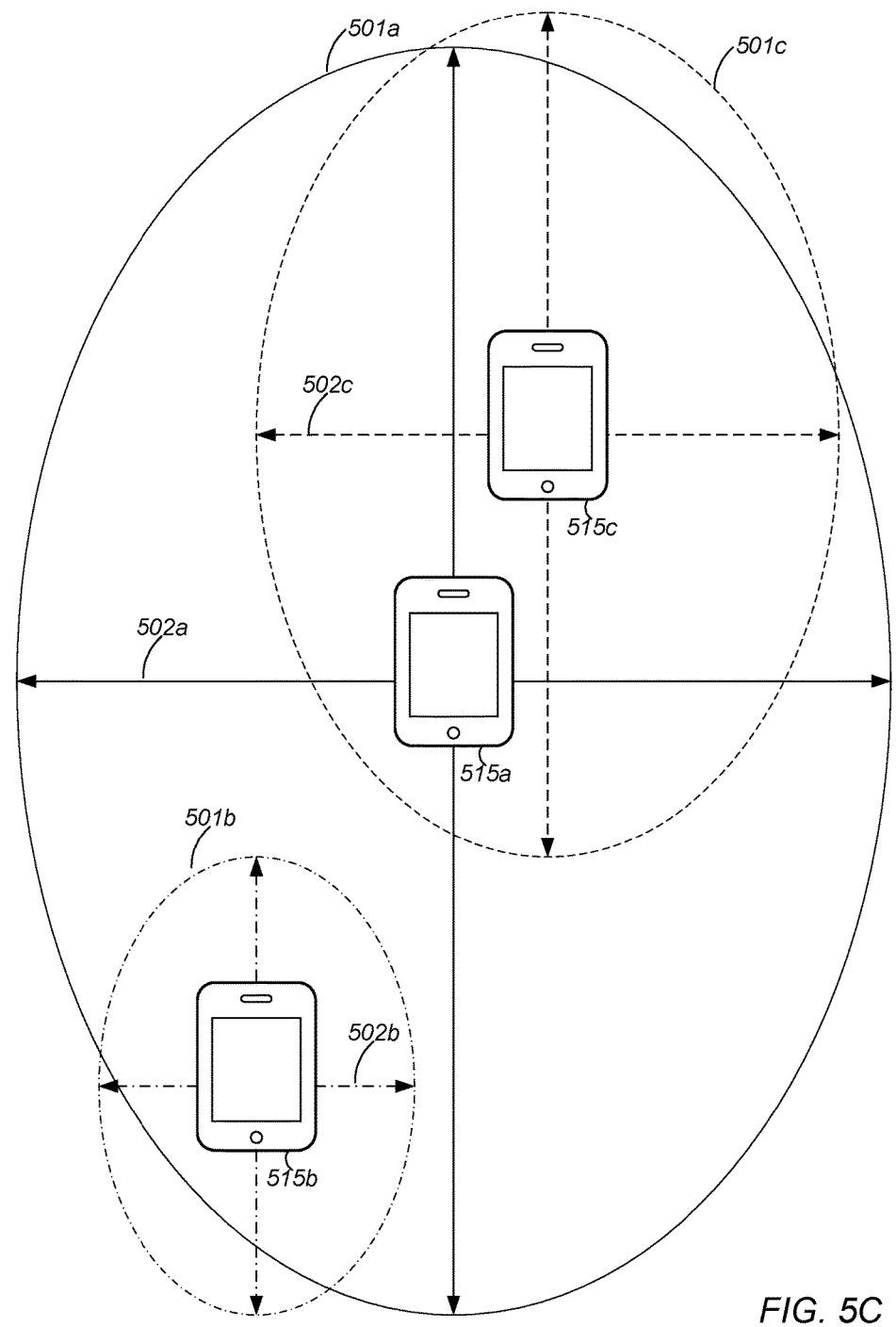

FIGS. 5A-C illustrate an example scenario of asymmetric behavior amongst peer devices. As shown, device 515a may transmit beacons 502a within a transmit range 501a of device 515a (e.g., as shown in FIGS. 5A-5C) that may be received by devices 515b and 515c. In addition, device 515c may transmit beacons 502c within a transmit range 501c of device 515c (e.g., as shown in FIGS. 5B-5C) that may be received by device 515a but not device 515b. Further, device 515b may transmit beacons 502b within transmit range 501b of device 515b (e.g., as shown in FIG. 5C) that may not be received by device 515a or 515c. Thus, device 515a may be aware of device 515c and device 515c may be aware of device 515a. However, device 515b may be aware of device 515a, but device 515a may not be aware of device 515b (e.g., since device 515a may not receive device 515b's beacons). In some instances, device 515b may attempt data communications with device 515a, unaware that device 515a has not received device 515b's beacons, thereby causing device 515b to delay possible communications with other peer devices and unnecessarily consume system resources.

Embodiments described herein include methods and techniques for a device, such as client station 106, to detect whether a peer (or neighboring) device is reachable. In other words, embodiments described herein include methods and techniques for peer devices to detect asymmetric awareness.

In some embodiments, a device (e.g., such as client station 106) may, upon reception of a beacon from a neighboring device (e.g., a peer device), create (maintain and/or update) a Bloom filter based, at least in part, on a medium access control (MAC) address of the neighboring device. For example, a first device, upon reception of a beacon from a second device, may use a hash function to create a Bloom filter based on a MAC address of the second device. The Bloom filter may include the MAC address (or other such identifier) of each device from which it has received a beacon, e.g., within a period of time.

In some embodiments, a Bloom filter attribute may be included in transmitted beacons (e.g., synchronization and/or discovery beacons) and a device, upon reception of a beacon including the Bloom filter attribute, may parse (or search) the Bloom filter attribute for the device's own MAC address. In other words, a peer device upon reception of a beacon with a Bloom filter attribute from another peer device may parse the Bloom filter attribute and look (or search) for the presence of its own MAC address in the Bloom filter attribute (or the Bloom filter included in the attribute).

In some embodiments, if a first peer device discovers (or matches) its MAC address in a Bloom filter attribute received in a beacon (e.g., a synchronization and/or discovery beacon) from a second peer device, the first peer device may confirm symmetric discovery (e.g., the first peer device confirms that the second peer device received the first peer device's transmitted beacon). In other words, the presence of the MAC address of the first peer device in the Bloom filter attribute of the second peer device confirms that the second peer device received a transmitted beacon that included the first peer device's MAC address and thus is aware of the first peer device. In such instances, the first peer device may then flag (or allow) data communications with the second peer device based (at least in part) on the confirmation that the second peer device received a transmitted beacon from the first peer device. In other words, prior to initiating data communications (e.g., a datapath and/or data link) between devices, the devices may both confirm that the other device has received its beacon transmission(s) as evidenced via respective Bloom filter attributes included in the beacon transmissions received from the other device.

In some embodiments, if a first peer device does not discover (or match) its MAC address in a Bloom filter attribute received in a beacon from a second peer device, the first peer device may suspend (or freeze) attempts to communicate (e.g., initiate data communications) with the second peer device. In other words, the first peer device may not attempt data communications with the second peer device based (at least in part) on not discovering its MAC address in the Bloom filter attribute received in the beacon from the second peer device. As a result of not discovering its MAC address in the Bloom filter attribute generated and transmitted by the second device, the first device can conclude that its beacons have not been received by the second device.

Figure 6:
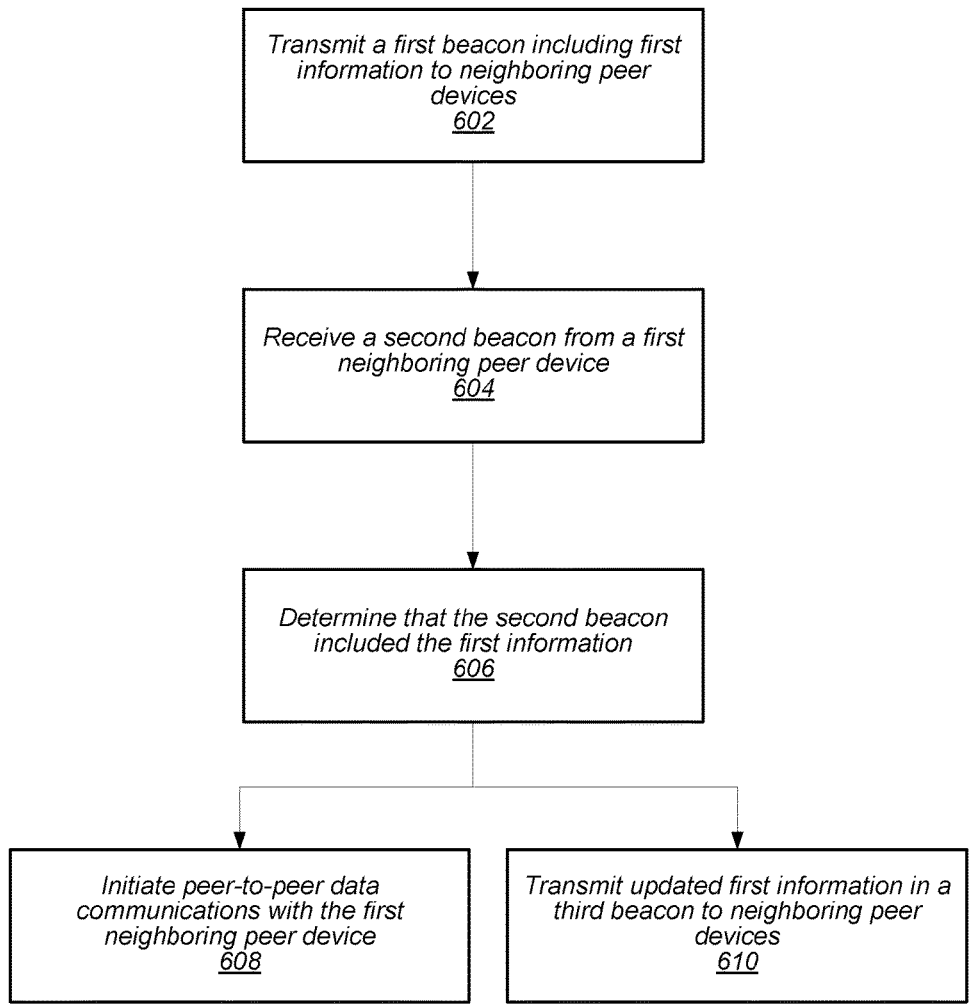
FIG. 6 illustrates a block diagram of an example method for detecting asymmetric awareness amongst peers, according to some embodiments.

FIG. 6 illustrates a block diagram of an example method for detecting asymmetric awareness amongst peers, according to some embodiments. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 602, a first beacon may be transmitted, e.g., to one or more neighboring peer devices. The first beacon may include first information identifying a device, such as client station 106. In some embodiments, the first beacon may be a synchronization beacon and/or a discovery beacon. In some embodiments, the first beacon may include an attribute that includes the first information. In some embodiments, the first information may include a Bloom filter associated with the identity of the device. In some embodiments, the identity may include a medium access control (MAC) address of the device. In some embodiments, the identity may include a hash function of the MAC address of the device. In still other embodiments, one or more other device identifiers can be used in addition to or in place of the MAC address.

At 604, a second beacon may be received from a first neighboring peer device. In some embodiments, the second beacon may be a synchronization beacon and/or a discovery beacon. In some embodiments, the second beacon may include a Bloom filter attribute that includes or otherwise represents the first information. In some embodiments, the Bloom filter attribute may be populated based on the first information being received by the first neighboring peer device in the first beacon. For example, the first neighboring peer device can include in its beacon a representation of information included in the beacon(s) it has received. In some embodiments, the representation of information included in the received beacon(s) can be included in the second beacon for a predetermined duration. After the predetermined duration passes, unless the information has been included in a more recently received beacon, the information can be purged from subsequent second beacon transmissions. In other words, a device may track an age of the first information or a time of receipt of the first information and may rely on the first information for a duration of time after which the first information is discarded and/or updated.

At 606, it may be determined that the second beacon includes the first information. In some embodiments, to determine that the second beacon includes the first information, an attribute of the second beacon may be searched for the first information. In other words, data included in the attribute may be compared to the first information to determine whether the first information is included in the data. For example, upon receiving the second beacon, the Bloom filter can be processed to determine whether it contains the MAC address of the device that transmitted the first beacon, indicating that the first beacon was received by the first neighboring peer device.

Optionally (or in addition), at 608, a data communication session (e.g., a peer-to-peer data communication session) may be initiated (or attempted) with the first neighboring peer device based (at least in part) on the second beacon including the first information. In some embodiments, the data communication session may be conducted (performed) according to the NAN protocol. In some embodiments, the data communication session may be conducted (performed) according to the AWDL protocol.

Optionally (or in addition), at 610, a third beacon may be transmitted, e.g., to one or more neighboring peer devices. The third beacon may include updated first information identifying the device, such as client station 106, as well as the first neighboring peer device. In some embodiments, the third beacon may be a synchronization beacon and/or a discovery beacon. In some embodiments, the third beacon may include an attribute that includes the updated first information. In some embodiments, the updated first information may include a Bloom filter associated with the identity of the device and the identity of the first neighboring peer device. In some embodiments, the identities may include a medium access control (MAC) address of the device and a MAC address of the first neighboring peer device. In some embodiments, the identities may include a hash function of the MAC address of the device and a hash function of the MAC address of the first neighboring peer device. In still other embodiments, one or more other device identifiers can be used in addition to or in place of the MAC addresses.

In some embodiments, as further illustrated below in reference to FIG. 7, a third beacon may be received from a second neighboring peer device and it may be determined that the third beacon does not include the first information (e.g., the MAC address of the device transmitting the first beacon). Further, it may be determined to not initiate a data communication session with the second neighboring peer device based (at least in part) on the third beacon not including the first information. For example, the device transmitting the first beacon (602) can conclude that the second neighboring peer did not receive the first beacon (or any other beacons it has transmitted) by determining that the first information (e.g., the device's MAC address) was not included in the Bloom filter transmitted in the third beacon.

Figure 7:
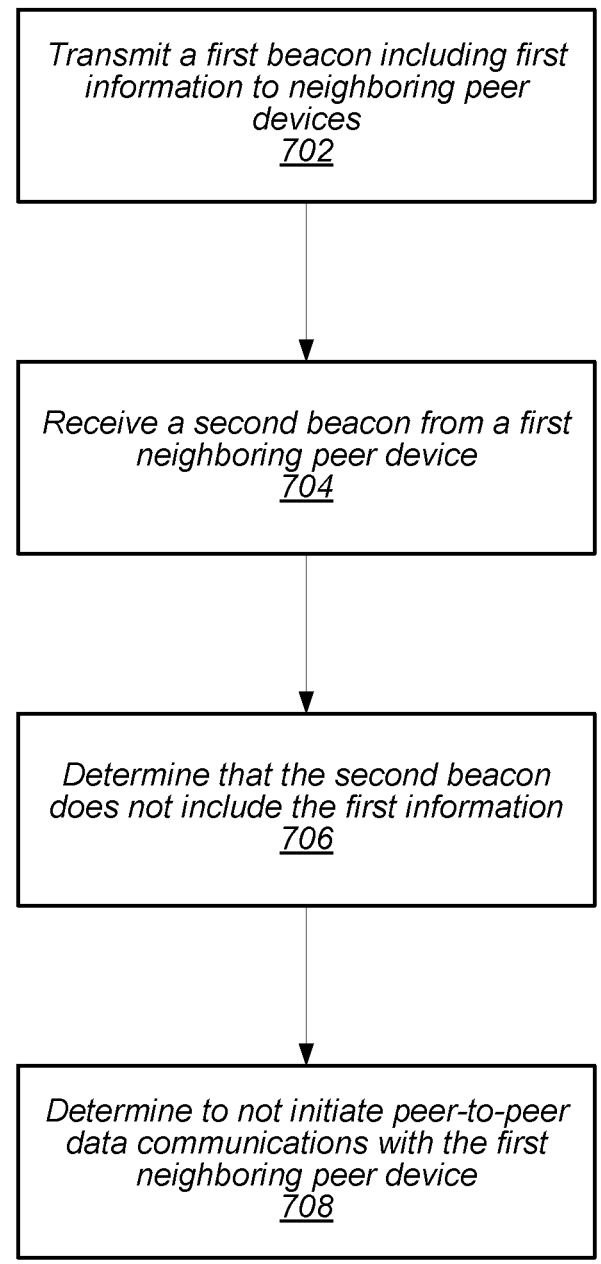
FIG. 7 illustrates a block diagram of another example method for detecting asymmetric awareness amongst peers, according to some embodiments.

FIG. 7 illustrates a block diagram of another example method for detecting asymmetric awareness amongst peers, according to some embodiments. The method shown in FIG. 7 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, a first beacon may be transmitted, e.g., to one or more neighboring peer devices. The first beacon may include first information identifying a device, such as client station 106. In some embodiments, the first beacon may be a synchronization beacon and/or a discovery beacon. In some embodiments, the first beacon may include an attribute that includes the first information. In some embodiments, the first information may include a Bloom filter associated with the identity of the device. In some embodiments, the identity may include a medium access control (MAC) address of the device. In some embodiments, the identity may include a hash function of the MAC address of the device. In still other embodiments, one or more other device identifiers can be used in addition to or in place of the MAC address.

At 704, a second beacon may be received from a first neighboring peer device. In some embodiments, the second beacon may be a synchronization beacon and/or a discovery beacon. In some embodiments, the second beacon may include a Bloom filter attribute that does not include or otherwise represent the first information.

At 706, it may be determined that the second beacon does not include the first information. In some embodiments, to determine that the second beacon does not include the first information, an attribute of the second beacon may be searched for the first information. In other words, data included in the attribute may be compared to the first information to determine whether the first information is included in the data. For example, upon receiving the second beacon, the Bloom filter can be processed to determine whether it contains the MAC address of the device that transmitted the first beacon, indicating whether the first beacon was received by the first neighboring peer device.

At 708, a data communication session (e.g., a peer-to-peer data communication session) may not be initiated (or attempted) with the first neighboring peer device based (at least in part) on the second beacon not including the first information. For example, the device transmitting the first beacon (702) can conclude that the first neighboring peer did not receive the first beacon (or any other beacons it has transmitted) by determining that the first information (e.g., the device's MAC address) was not included in the Bloom filter transmitted in the second beacon.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
at least one antenna;
at least one radio in communication with the at least one antenna and configured to perform communications via a Wi-Fi interface; and
at least one processor in communication with to the at least one radio;
wherein the at least one processor is configured to cause the wireless station to:
transmit a first beacon to neighboring wireless stations, wherein the first beacon includes first information identifying the wireless station, wherein the first information includes at least an indication of a medium access control (MAC) address of the wireless station;
receive a second beacon from a first neighboring wireless station, wherein the second beacon includes second information, wherein the second information includes at least an indication of a MAC address of the first neighboring wireless station;
receive a third beacon from a second neighboring wireless station, wherein the third beacon includes third information, where the third information includes at least an indication of a MAC address of the second neighboring wireless station;
determine that the second information further includes at least the first information and that the third information does not include at least the first information, wherein the determinations indicates that the first neighboring wireless station is within reception range of the wireless station and that the second neighboring wireless station is not within reception range of the wireless station, thereby confirming symmetric discovery between the wireless station and the first neighboring wireless station and asymmetric discovery between the wireless station and the second neighboring wireless station;
initiate, based at least in part on the confirmation of symmetric discovery, a peer-to-peer data communication session with the first neighboring wireless station; and
determine to not initiate, base at least in part on the confirmation of asymmetric discovery, a peer-to-peer data communication session with the second neighboring wireless station.

2. The wireless station of claim 1,
wherein to determine that the second beacon includes the first information, the at least one processor is further configured to cause the wireless station to search an attribute of the second beacon for the first information.

3. The wireless station of claim 1,
wherein the first beacon comprises a Bloom filter attribute comprising the first information.

4. The wireless station of claim 1,
wherein the first information comprises a Bloom filter associated with the identity of the wireless station.

5. The wireless station of claim 4,
wherein the identity comprises the medium access control (MAC) address of the wireless station.

6. The wireless station of claim 4,
wherein the identity comprises a hash function of the medium access control (MAC) address of the wireless station.

7. The wireless station of claim 1,
wherein the at least one processor is further configured to cause the wireless station to:
update, in response to receiving the second beacon, a Bloom filter based, at least in part, on the medium access control (MAC) address of the first neighboring wireless station; and
include the updated Bloom filter in subsequent beacons transmitted to neighboring wireless stations, including the first neighboring wireless station.

8. The wireless station of claim 7,
wherein the MAC address is included in a Bloom filter attribute included in the second beacon.

9. An apparatus, comprising:
a memory; and
at least one processor in communication with the memory, wherein the at least one processor is configured to:
transmit a first beacon, wherein the first beacon includes a first identifier associated with the apparatus, wherein the first identifier includes at least an indication of a medium access control (MAC) address associated with the apparatus;
receive a second beacon from a first neighboring wireless station, wherein the second beacon includes a second identifier associated with the first neighboring wireless station wherein the second identifier includes at least an indication of a MAC address of the first neighboring wireless station;
receive a third beacon from a second neighboring wireless station, wherein the third beacon includes a third identifier associated with the second neighboring wireless station, wherein the third identifier includes at least an indication of a MAC address of the second neighboring wireless station;
determine that the second beacon further includes at least the first identifier and that the third beacon does not include at least the first identifier, wherein the determinations indicates that the first neighboring wireless station is within reception range of the apparatus and that the second neighboring wireless station is not within reception range of the apparatus, thereby confirming symmetric discovery between the apparatus and the first neighboring wireless station and asymmetric discovery between the apparatus and the second neighboring wireless station;
update, in response to receiving the second beacon, a Bloom filter based, at least in part, on the second identifier;
include the updated Bloom filter in subsequent beacons transmitted to neighboring wireless stations, including the first neighboring wireless station; and
determine to initiate, based at least in part on the confirmation of symmetric discovery, a peer-to-peer data communication session with the first neighboring wireless station and to not initiate, based at least in part on the confirmation of asymmetric discovery, a peer-to-peer data communication session with the second neighboring wireless station.

10. The apparatus of claim 9,
wherein to determine that the second beacon includes the first identifier, the at least one processor is further configured to search an attribute of the second beacon for the first identifier.

11. The apparatus of claim 9,
wherein the at least one processor is further configured to:
receive a fourth beacon from a third neighboring wireless station, wherein the fourth beacon includes a fourth identifier associated with the third neighboring wireless station;
determine that the fourth beacon includes the first identifier; and
update, in response to receiving the fourth beacon, the updated Bloom filter based, at least in part, on the fourth identifier, thereby generating a new Bloom filter; and
include the new Bloom filter in subsequent beacons transmitted to neighboring wireless stations, including the first and third neighboring wireless stations.

12. The apparatus of claim 9,
wherein the MAC address associated with the apparatus is included in a Bloom filter.

13. The apparatus of claim 9,
wherein the first identifier comprises a hash function of the medium access control (MAC) address associated with the apparatus.

14. A non-transitory computer readable memory medium storing program instructions executable by a processor of a wireless station to:
transmit a first beacon to neighboring wireless stations, wherein the first beacon includes first information identifying the wireless station, wherein the first information includes at least an indication of a medium access control (MAC) address of the wireless station;
receive a second beacon from a first neighboring wireless station, wherein the second beacon includes the first information identifying the wireless station and second information identifying the neighboring wireless station, wherein the second information includes at least an indication of a MAC address of the first neighboring wireless station;
receive a third beacon from a second neighboring wireless station, wherein the third beacon includes third information, where the third information includes at least an indication of a MAC address of the second neighboring wireless station;
determine, based at least in part on the second beacon including the first information and the third beacon not including the first information, that the first neighboring wireless station is within reception range of the wireless station and that the second neighboring wireless station is not within reception range of the wireless station, thereby confirming symmetric discovery between the wireless station and the first neighboring wireless station and asymmetric discovery between the wireless station and the second neighboring wireless station;
update a Bloom filter with the second information;
transmit a second beacon to the neighboring wireless station, wherein the second beacon includes the updated Bloom filter; and determine to initiate, based at least in part on confirmation of symmetric discovery, a peer-to-peer data communication session with the neighboring wireless station and to not initiate, based at least in part on the confirmation of asymmetric discovery, a peer-to-peer data communication session with the second neighboring wireless station.

15. The non-transitory computer readable memory medium of claim 14, wherein the program instructions are further executable to:

search an attribute of the first beacon for the first information.

16. The non-transitory computer readable memory medium of claim 14, wherein the first information and the second information are included in a Bloom filter attribute of the first beacon.

17. The non-transitory computer readable memory medium of claim 16, wherein the first information comprises a first hash of the medium access control (MAC) address associated with the wireless station;

wherein the second information comprises a second hash of the MAC address associated with the first neighboring wireless station.

18. The non-transitory computer readable memory medium of claim 14, wherein the MAC address associated with the wireless station is included in a Bloom filter.

19. The non-transitory computer readable memory medium of claim 14, wherein the program instructions are further executable to:

receive a fourth beacon from a third neighboring wireless station, wherein the fourth beacon includes fourth information, wherein the fourth information includes at least an indication of a MAC address of the third neighboring wireless station;

determine that the fourth beacon includes the first information; and update, in response to receiving the fourth beacon, the updated Bloom filter based, at least in part, on the fourth information, thereby generating a new Bloom filter; and include the new Bloom filter in subsequent beacons transmitted to neighboring wireless stations, including the first and third neighboring wireless stations.

20. The wireless station of claim 1, wherein the at least one processor is further configured to:

receive a fourth beacon from a third neighboring wireless station, wherein the fourth beacon includes fourth information, wherein the fourth information includes at least an indication of a MAC address of the third neighboring wireless station;

determine that the fourth beacon includes the first information; and update, in response to receiving the fourth beacon, a Bloom filter based, at least in part, on the fourth information, thereby generating a new Bloom filter; and include the new Bloom filter in subsequent beacons transmitted to neighboring wireless stations, including the first and third neighboring wireless stations.

* * * * *